March 19, 1935. R. B. COMBS Re. 19,501

SCROLL SAW

Original Filed Feb. 7, 1931 2 Sheets-Sheet 1

INVENTOR
RALPH B. COMBS
BY
Carl A. Hellmann
ATTORNEY

SCROLL SAW

Original Filed Feb. 7, 1931 2 Sheets-Sheet 2

INVENTOR
RALPH B. COMBS,
BY
Carl A. Hellmann,
ATTORNEY

Reissued Mar. 19, 1935

Re. 19,501

UNITED STATES PATENT OFFICE 19,501

SCROLL SAW

Ralph B. Combs, Ponca City, Okla., assignor, by mesne assignments, to Delta Manufacturing Company, Milwaukee, Wis., a corporation of Wisconsin Original No. 1,839,647, dated January 5, 1932, Serial No. 514,109, February 7, 1931. Application for reissue July 7, 1933, Serial No. 679,412

9 Claims. (Cl. 143—70)

My invention relates to improvement in scroll saws.

The object of my invention is to provide a scroll saw that eliminates rocking movement of the blade in its vertical reciprocation.

A further object of my invention is to provide a scroll saw having an air pump with a spring housed therein as actuating means for the saw blade and pump simultaneously and the pump having a blow pipe as means to remove the saw dust accumulation from the cutting point during the operation of the sawing.

A still further object of my invention is to provide means to turn the saw blade and a guide for the saw blades of different widths, the guide being revolubly mounted and adapted to turn with the direction of the saw blade.

A still further object of my invention is to provide a saw table that will turn on the same axis with the saw blade turning means, and the table tiltingly arranged.

A still further object of my invention is to provide a crank case for the pitman as an oiling means therefor.

A still further object of my invention is to provide an inexpensive construction for a motor driven scroll saw.

These and other objects will hereinafter be more fully explained, reference being had to the accompanying drawings which form a part of this specification, and in which like characters will apply to like parts in the different views, and in which.

Figure 1:
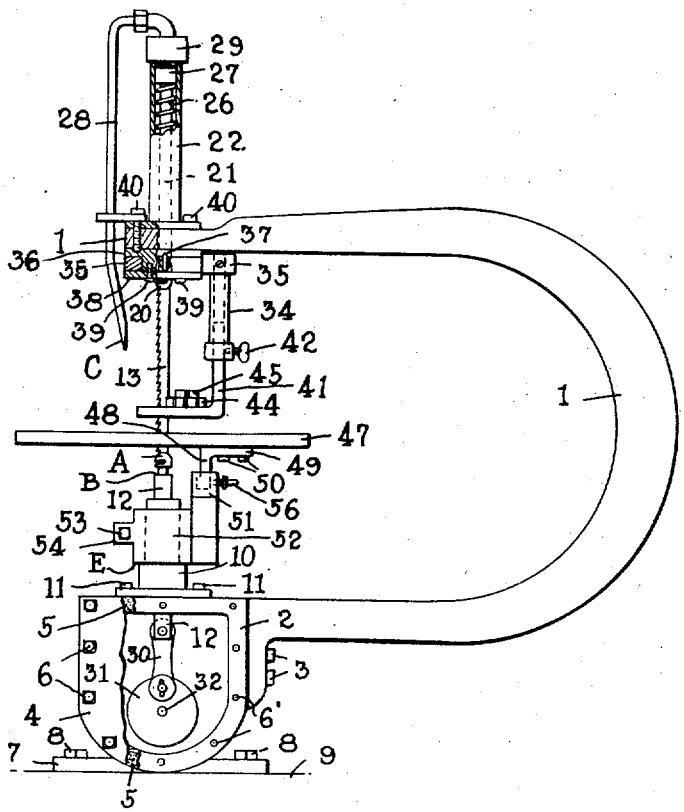
Fig. 1 is a side view of the machine, parts broken away for convenience of illustration.

My invention consists of a U-shaped frame 1 having a crank case 2 attached to the end of the lower leg thereof by cap screws 3, the said crank case having a removable head 4 and a gasket 5 as oil tight sealing means therefor when the head is tensioned tightly thereon by a plurality of cap screws 6 that threadedly engage in apertures 6'. The said crank case is provided with a flanged base 7 by which means the machine may be firmly attached to a support by cap screws 8, the said support being horizontally disposed as shown by line 9 and on which a motor may be placed in close proximity to the machine, the motor not being shown.

Figure 6:
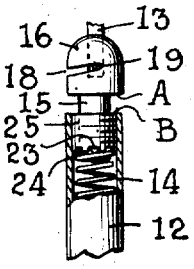
Fig. 6 is an enlarged elevation of a fragmentary portion of the saw piston and a connecting means for the lower end of the saw blade, parts broken away for convenience of illustration.

Positioned on the uppermost part of the crank case is a flange sleeve 10 secured thereto by cap screws 11, the bore of the sleeve being in registry with an aperture in the said crank case, and in which slidably engages a piston 12 to which the saw blade 13 is attached. The said piston is bored axially at the upper end portion thereof to receive a coil spring 14 engaging with the lower end of a link 15 as a medium by which the saw blades are attached to the piston; the said link has a head 16 on the upper end thereof; the shoulder as at A may be pushed downward to engage on the piston as at B as detaching means for the lower end of the link, when rotation is desired, later described. Extending diametrically across the head is a slot 17, the said slot communicating with a solt 18 transversely positioned and sloping upward with respect to a horizontal plane, the last said slot terminating near the axis of the link, by which means the said saw blade may be axially aligned and attached by a pin 19 passing thru the lower end thereof and slidably passing to position in the said slots, and slot 18 sloping upward as shown in Fig. 6 will retain the said pin to axially align the said blade with the piston. It is now readily seen how saw blades of different widths may be properly connected to the head of the link, and easily placed and removed, and there is a similar arrangement in the head 20 as attaching means for the upper end of the saw blade, the last said head being carried by a piston rod 21 and slidably engaging in a tubular guide or head forming an air chamber 22 and free to turn therein at the time of turning the saw blade, which is accomplished by pressing downward on the link which has a pin 23 passing diametrically thru the lower end thereof and adapted to seat in diametrically positioned notches 24, a plurality of which are spaced around the lower rim portion of the threaded sleeve 25 that threadedly engages in the upper end of the piston 12. It is understood that the said spring 14 is in contact with the pin 23 while the lower end of the link enters the coil of the springs as centering means therefor, the said spring functioning as a tension for snug engagement of the said pin in the selective notches for the angle of the blade which is accomplished by pressing downward on the head as previously described and turning the same, and the piston at the upper end thereof is free to respond to the turn of the blade.

As a tensioning means to raise the saw blade, I have provided a recoil spring 26 positioned on the piston rod 21 previously described, the lower end of the spring being seated on the lower end of the air chamber while the upper end engages on the lower side of the head 27 integral with the piston rod and functions as a compressor to cause breathing through the tube 28, the lower end of which is open, while the upper end tightly connects with a cap 29 that is secured air tight on the upper end of the air chamber. It will now be understood that the reciprocating movement of the blade will cause the air contained in the chamber to be injected and ejected through the said tube, by which means saw dust is driven from a workpiece being sawed so that a line placed thereon to be followed by the saw blade is visible at all times, and the lower end of the tube being cut at an angle with respect to the longitudinal axis thereof as shown at C is the directing means for the outward force of the air current toward the cutting edge of the blade. The reciprocating movement of the saw blade is provided by the medium of a pitman 30 driven by a disc 31 attached to a shaft 32 and rotatable therewith functioning as a crank, and on said shaft is a pulley 33 on which a motor driven belt will engage, the motor and belt not being shown in the drawings.

In as much as the saw blade is arranged to turn as previously described, the presser foot is arranged to turn also, but independently of the turning of the saw blade. The presser foot consists of a hollow leg 34 having a collar 35 secured to the upper end thereof and adapted to turn on a hub 36 and stationarily attached by a set screw 37 threadedly engaging therethrough, the said collar being supported in position by a plate 38 secured by screws 39, and the hub being attached to the upper end of the U-shaped member by cap screws 40, all substantially as shown in Fig. 1.

Figure 5:
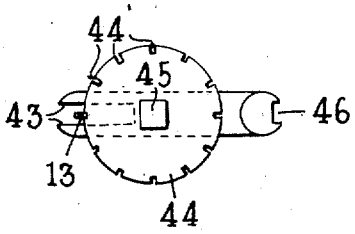
Fig. 5 is an enlarged plan view of the saw blade back stop and presser foot.
Figure 7:
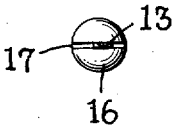
Fig. 7 is an upper end view of Fig. 6.

Positioned in the hollow of the leg is a shank 41, which is secured against longitudinal movement by a set screw 42, by which means the presser foot may be raised or lowered to a desired position. Positioned at right angles to the shank and integral therewith is a foot which is bifurcated on the outer end thereof, the prongs of which are identified by numeral 43, and between which the saw blade is positioned. As a backing means for saw blades of different widths, I have arranged a disc like element 44 revolubly arranged and secured to the foot by a cap screw 45 that extends through an aperture centrally positioned in the disc, and threadedly engaging in the foot member as rigid supporting means when properly positioned. The said disc element has a plurality of slots 44' spaced therearound on the periphery thereof, the said slots varying in depth and being radially positioned, the object of which is to accommodate blades of different widths. In Fig. 5 is shown a groove 46 extending longitudinally on the rear side of the shank and in which the end of the set screw 42 will engage, and so arranged that the shank, when the set screw is backed outward, is free to move longitudinally in the hollow of the leg and may be secured in any desired position and against rotation.

Figure 2:
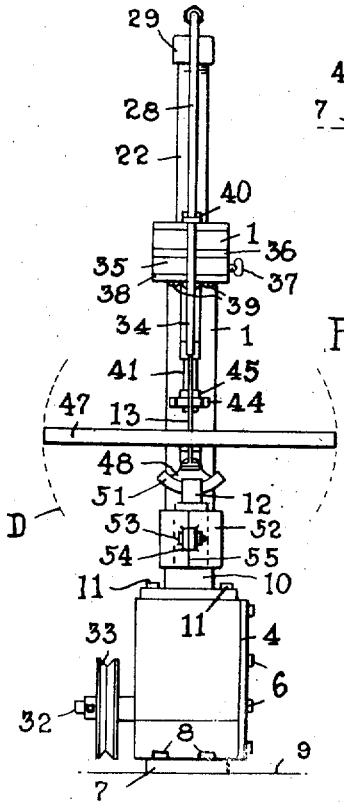
Fig. 2 is a front view of Fig. 1.
Figure 3:
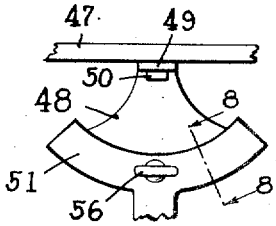
Fig. 3 is an enlarged detail view of the tilting mechanism for the table.
Figure 8:
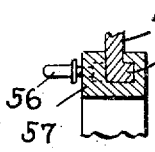
Fig. 8 is a sectional view taken on line 8—8 in Fig. 3.
Figure 4:
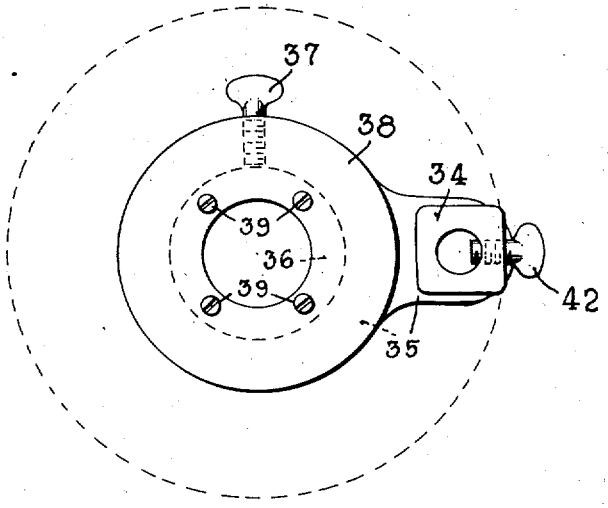
Fig. 4 is an enlarged detail plan view of the presser foot collar.

In Figs. 1 and 2 is shown a table 47 tiltingly arranged and adapted to rock in either direction as shown by dotted lines D, the axis being at the top of the table top and being in the axis of the saw blade. The means to support the table is through the medium of a sector disc 48 having a right angled leg 49 secured to the table bottom by cap screws 50, the arcuate portion of the sector having a tongue 48' positioned at right angles and extending from one side thereof and seated in a grooved arcuate support 51 that is carried by a collar 52 seated on the shoulder E of sleeve 10 and revoluble thereon and locked thereto when properly positioned by a cap screw 53 engaging with ears 54 that are integral with the collar, it being understood that the collar is split as shown at 55 and so arranged that it will function as a clutch. The sector, having its bearing in the arcuate portion and slidably engaging therein as described, is secured at the desired position by a set screw 56 engaging on a brake shoe 57, shown by dotted lines, that frictionally engages on the side of the sector disc 48.

It is now readily seen how the table top may be turned in the same direction with the saw blade and tilted to a desired angle from either side of the blade.

Such modifications may be employed as lie within the scope of the appended claims, and having fully described my invention,

I claim:

1. A scroll saw of the class described comprising a U-shaped frame, a crank case attached to one end thereof, a breathing pump cylinder on the other end, the pump having a recoil spring and a plunger housed therein, and a tube extending from the upper end downward as an exhaust pipe.

2. In a scroll saw, a fluid tight crank case having a removable side, and a U-shaped frame carried by the case and detachably arranged, a sleeve attached to the crank case and upwardly extending, a table and supporting means therefor, the means being carried by the sleeve and rotatable thereon, and means in the first said means to rock the table to a desired angle and lock the same when positioned.

3. In a scroll saw, a frame, a crank case, and an air chamber having a plunger and spring actuating means for the upper stroke thereof, the plunger comprising a piston rod and a breathing head on the upper end thereof and a connection head on the lower end thereof, the plunger free to revolve when turned by the saw blade, a crank, pitman, and piston coacting for reciprocating movement of a saw blade, a saw blade and a link, and means to attach the same to the lower end of the blade, the link carried by the piston and revolvable therein as turning means for the saw blade.

4. A scroll saw having a crank case, operating means for a saw blade enclosed in said crank case, a cylindrical bearing member attached to said crank case and having its axis substantially in line with the saw blade, a cooperating bearing member surrounding said first-named bearing member, said second bearing member being freely rotatable about said first bearing member, means for clamping said bearing members together when desired, to prevent such rotation, a saw table, and means securing the saw table for rotary adjustment with respect to said second-named bearing member, whereby said table may be adjusted both about an axis parallel to the direction of the blade and about an additional axis substantially perpendicular to the saw blade, said second-named axis lying substantially in the plane of the top of the table.

5. A scroll saw having a U-shaped frame with its arms extending substantially horizontally, a tubular upper head rigidly and immovably supported by one arm of said frame, said tubular head having means for supporting one end of a saw blade associated therewith, a blade support also associated with said tubular head and rotatable about the axis of said head, and a lower tubular guide for supporting the other end of the saw blade, said lower tubular guide being rigidly secured with respect to the lower arm of the said frame.

6. A scroll saw having a U-shaped frame with its arms extending substantially horizontally, an upper head rigidly and immovably mounted at the upper end of said frame, and having means for supporting one end of a saw blade, said means being rotatable about its own axis to present the saw blade at any desired angle, a blade support also rotatably secured to said end of the frame whereby it may be adjusted into proper angular position to cooperate with the blade when so rotated, and a lower tubular guide for supporting the other end of the saw blade, said lower tubular guide being rigidly secured with respect to the lower arm of the said frame.

7. A scroll saw having a U-shaped frame with its arms extending substantially horizontally, an upper head rigidly and immovably mounted at the upper end of said frame, and having means for supporting one end of a saw blade, said means being rotatable about its own axis to present the saw blade at any desired angle, a blade support also rotatably secured to said end of the frame whereby it may be adjusted into proper angular position to cooperate with the blade when so rotated, said blade support comprising two portions which are longitudinally adjustable with respect to one another, to make it possible to vary the elevation of the said support, and a lower tubular guide for supporting the other end of the saw blade, said lower tubular guide being rigidly secured with respect to the lower arm of the said frame.

8. A scroll saw having a U-shaped frame with its arms extending substantially horizontally, an upper head rigidly and immovably mounted at the upper end of said frame, and having means for supporting one end of a saw blade, said means being rotatable about its own axis to present the saw blade at any desired angle, a blade support also rotatably secured to said end of the frame whereby it may be adjusted into proper angular position to cooperate with the blade when so rotated, said support being provided with means for securing it in position when so adjusted, and a lower tubular guide for supporting the other end of the saw blade, said lower tubular guide being rigidly secured with respect to the lower arm of the said frame.

9. A scroll saw having a U-shaped frame with its arms extending substantially horizontally, an upper head rigidly and immovably mounted at the upper end of said frame, and having means for supporting one end of a saw blade, said means being rotatable about its own axis to present the saw blade at any desired angle, a blade support also rotatably secured to said end of the frame whereby it may be adjusted into proper angular position to cooperate with the blade when so rotated, said support being provided with means for securing it in position when so adjusted, said blade support also comprising two portions which are longitudinally adjustable with respect to one another, to make it possible to vary the elevation of the said support, and a lower tubular guide for supporting the other end of the saw blade, said lower tubular guide being rigidly secured with respect to the lower arm of the said frame.

RALPH B. COMBS.